US012502587B1

(12) United States Patent
Dhillon

(10) Patent No.: US 12,502,587 B1
(45) Date of Patent: Dec. 23, 2025

(54) SPORTING HANDLE SHAFT

(71) Applicant: Rashpal Dhillon, Surrey (CA)

(72) Inventor: Rashpal Dhillon, Surrey (CA)

( * ) Notice: Subject to any disclaimer, the term of this patent is extended or adjusted under 35 U.S.C. 154(b) by 813 days.

(21) Appl. No.: 17/844,260

(22) Filed: Jun. 20, 2022

Related U.S. Application Data

(60) Provisional application No. 63/212,538, filed on Jun. 18, 2021.

(51) Int. Cl.
*A63B 60/12* (2015.01)
*A63B 53/14* (2015.01)
*A63B 59/70* (2015.01)
*G09F 17/00* (2006.01)

(52) U.S. Cl.
CPC .............. *A63B 60/12* (2015.10); *A63B 53/14* (2013.01); *A63B 59/70* (2015.10); *G09F 17/00* (2013.01)

(58) Field of Classification Search
CPC ......... A63B 60/12; A63B 59/70; A63B 53/14; G09F 17/00
See application file for complete search history.

(56) References Cited

U.S. PATENT DOCUMENTS

| | | | | |
|---|---|---|---|---|
| 5,080,363 A * | 1/1992 | Soong | A63B 53/14 | 473/316 |
| 6,935,968 B1 * | 8/2005 | Thomas | A63B 53/14 | 473/296 |
| 9,452,333 B1 * | 9/2016 | Chalifoux | A63B 53/14 | |
| 12,122,110 B1 * | 10/2024 | Hohn | A63B 53/12 | |
| 2004/0102255 A1 * | 5/2004 | Benson | A63B 53/00 | 473/296 |
| 2004/0116197 A1 * | 6/2004 | Benson | A63B 53/00 | 473/316 |
| 2010/0255926 A1 * | 10/2010 | Hueber | A63B 60/00 | 473/298 |
| 2012/0258817 A1 * | 10/2012 | Beach | A63B 53/10 | 473/296 |
| 2014/0378242 A1 * | 12/2014 | Chalifoux | A63B 60/28 | 473/549 |
| 2018/0311551 A1 * | 11/2018 | Oman | A63B 59/70 | |
| 2022/0001255 A1 * | 1/2022 | Oman | A63B 60/34 | |
| 2022/0409967 A1 * | 12/2022 | Boretto | A63B 53/10 | |
| 2023/0256304 A1 * | 8/2023 | Ahmadi | A63B 53/06 | 473/307 |

FOREIGN PATENT DOCUMENTS

| | | | |
|---|---|---|---|
| CA | 2232966 C * | 7/2006 | A63B 59/70 |
| CN | 117241864 A * | 12/2023 | A63B 15/005 |

* cited by examiner

*Primary Examiner* — Samir Abdosh
(74) *Attorney, Agent, or Firm* — Puget Sound Patents; Dwayne Rogge

(57) ABSTRACT

This disclosure relates to the field of sporting devices with an elongate handle with a first end which a player grasps and a second end with a blade, basket, head, or similar component which is configured to contact a ball, puck, or similar sporting component during play of a sport. The disclosure includes several variations on components attached to the elongate handle for different uses including a finger indexing groove, a collapsible handle, and a flagpole to be used in one example to show support for a sporting event or team.

6 Claims, 9 Drawing Sheets

SPORTING HANDLE SHAFT

Related Applications

This application claims priority of U.S. Provisional Patent Application Ser. No. 63/212,538 filed on Jun. 18, 2021 incorporated herein by reference.

BACKGROUND OF THE DISCLOSURE

Field of the Disclosure

This disclosure relates to the field of sporting devices in several examples with an elongate handle with a first end which a player grasps and a second end with a blade, basket, head, or similar component which is configured to contact a ball, puck, or similar sporting component during play of a sport. The disclosure includes several variations on components attached to the elongate handle for different uses.

BRIEF SUMMARY OF THE DISCLOSURE

Disclosed herein is a sporting device comprising in one example: an elongate shaft having a first end longitudinal configured to be grasped by a user; the elongate handle having a second end comprising a head extending transversely from the elongate shaft; the first end of the elongate handle comprising a grip section removably attached to the elongate shaft; and the grip section having a transverse outer surface.

The sporting device may be arranged wherein: the first end of the elongate shaft is hollow; the grip section comprises a male tenon slide fit into the hollow first end; the grip section comprises a finger groove transversely indented from the transverse outer surface of the grip section; the finger groove configured to facilitate and improve gripping by the player's small proximal phalanx.

The sporting device may be arranged wherein the sporting device comprises a hockey stick. A hockey stick is a piece of sports equipment used by the players in all the forms of hockey to move a ball or puck (as appropriate to the type of hockey) either to push, pull, hit, strike, flick, steer, launch or stop the ball/puck during play with the objective being to move the ball/puck around the playing area using the stick, and then trying to score points by placing the ball/puck in the opponents goal.

The word "stick" is a term for the equipment since the different disciplines of hockey require significant differences in both the form and the size of the stick used for it to be effective in the different sports. Field/ice/roller hockey all use a stick with a long shaft or handle which can be held with two hands, and a curved and flattened end.

The sporting device may be arranged wherein the sporting device comprises a goalie stick. The goaltender has a slightly modified stick (goalie stick). The lower part of the goalie stick is wider, the angle is smaller, and the blade is slightly curved towards the direction of the play. Goaltender sticks are often made of the same composite technology as used in regular sticks.

The sporting device may be arranged wherein: the grip section comprises a surface defining a female receiver slide fit over the first end of the elongate shaft; the grip section of one example comprises a finger groove transversely indented from the transverse outer surface of the grip section; the finger groove configured to facilitate and improve gripping by the user's small proximal phalanx.

The sporting device may be arranged wherein the sporting device comprises a golf club. A golf club is a club used to hit a golf ball in a game of golf. Each golf club is composed of a shaft with a grip and a club head. Several examples of sporting devices are disclosed, comprising: a segmented elongate shaft having a first longitudinal end configured to be grasped by a user; the elongate shaft of some examples comprising a blade section having a first end with a blade extending transversely therefrom and a longitudinally opposed second end; the elongate shaft comprising a flag shaft section having a first longitudinal end attached to the second end of the blade section, and a first shaft section; the elongate handle having a second end comprising a head extending transversely from the elongate shaft; and at least one attachment point on the flag shaft section.

DETAILED DESCRIPTION OF THE DISCLOSURE

Figure 1:
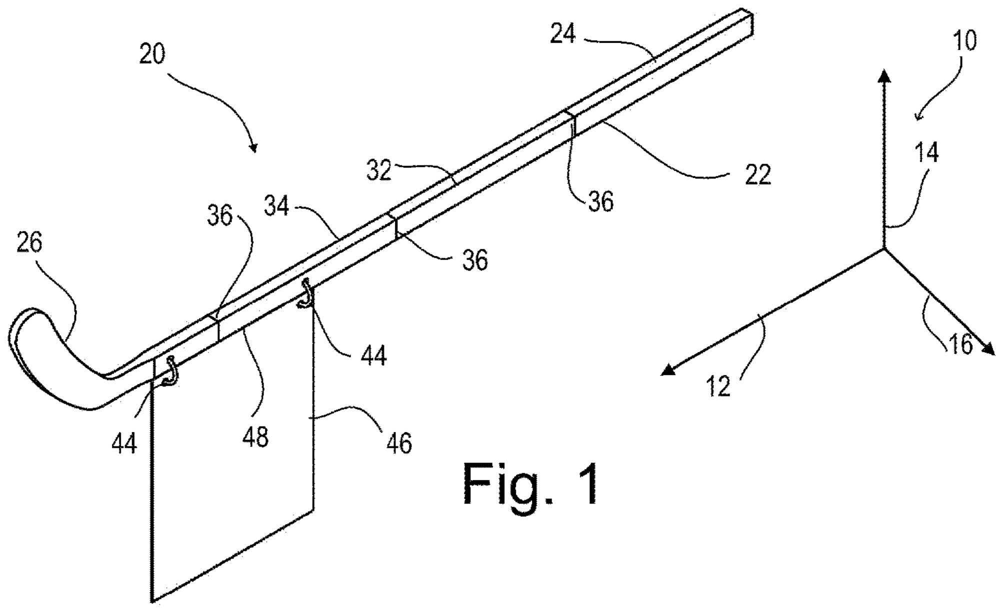
FIG. 1 is a perspective view of one example of the disclosed sporting handle shaft with an attached flag.
Figure 2:
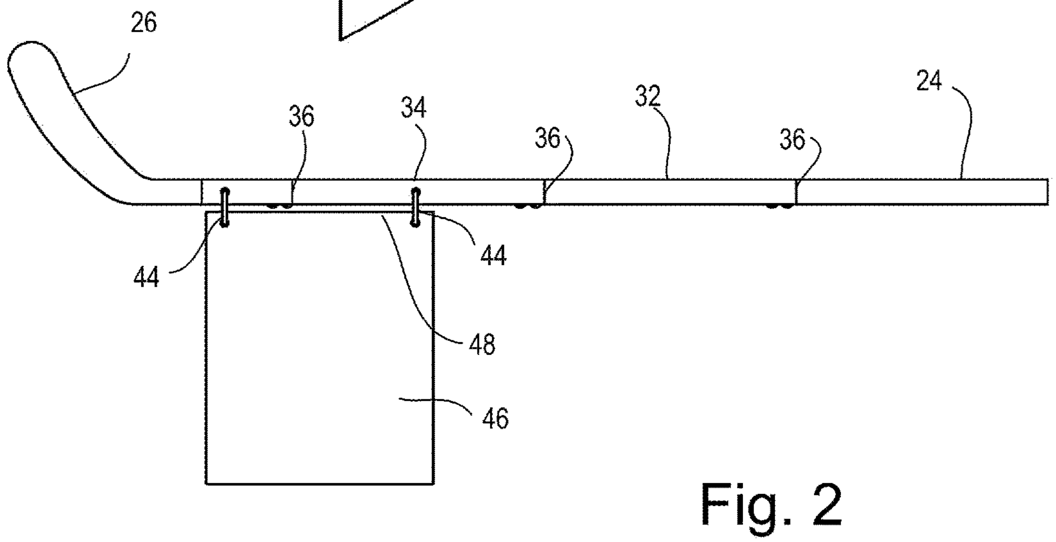
FIG. 2 is a side view of the example shown in FIG. 1.
Figure 3:
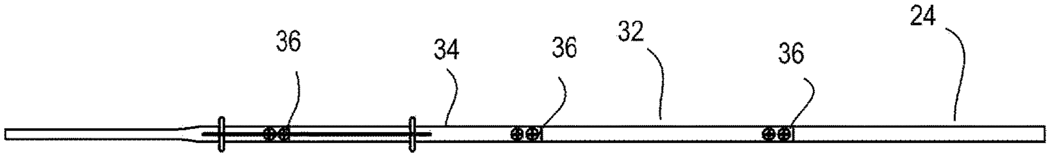
FIG. 3 is a bottom view of the example shown in FIG. 1.
Figure 4:
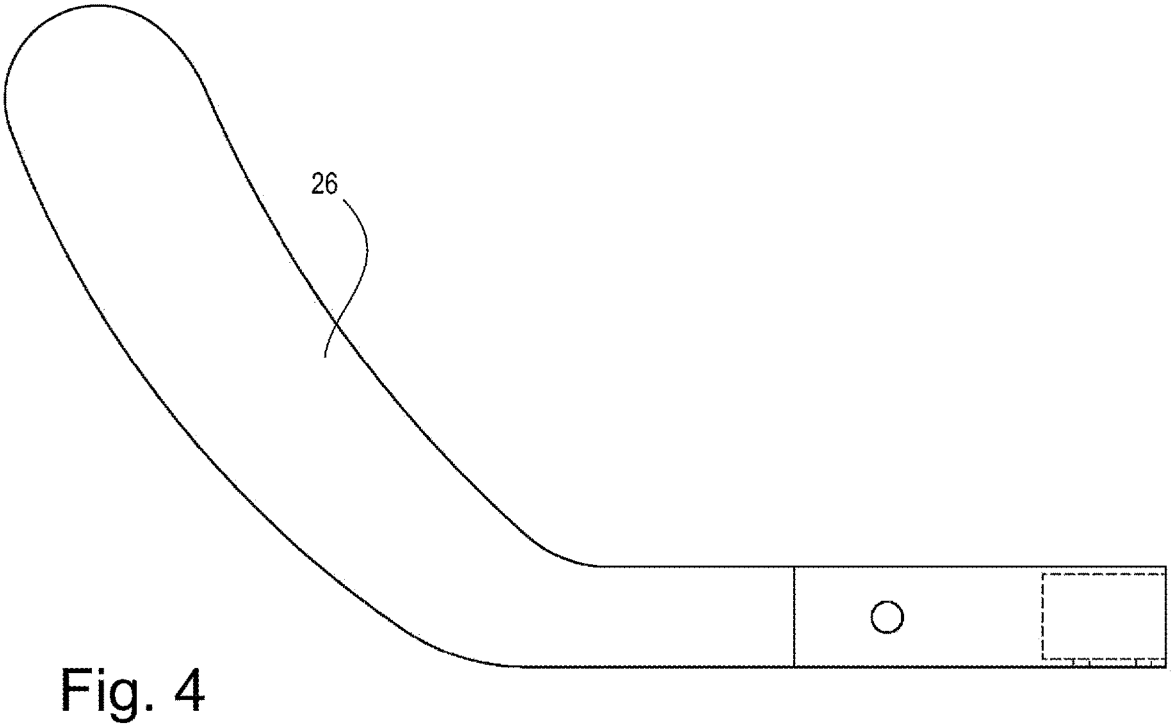
FIG. 4 is a side hidden line view of a blade section of the example shown in FIG. 1.
Figure 5:
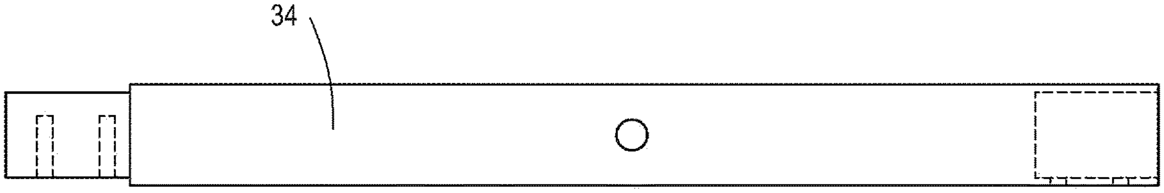
FIG. 5 is a side hidden line view of a handle section shown in FIG. 1.
Figure 6:
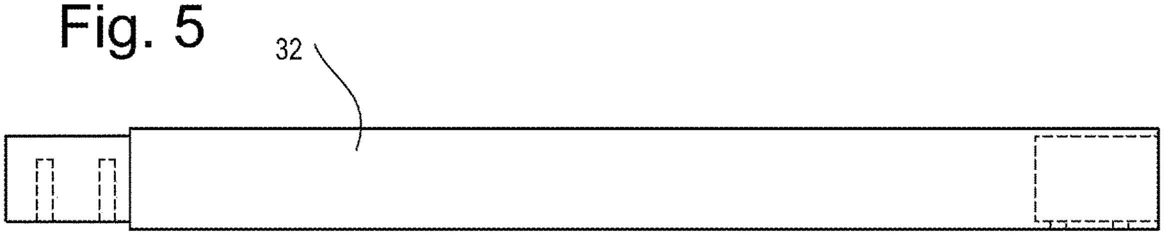
FIG. 6 is a side hidden line view of a handle section shown in FIG. 1.
Figure 7:
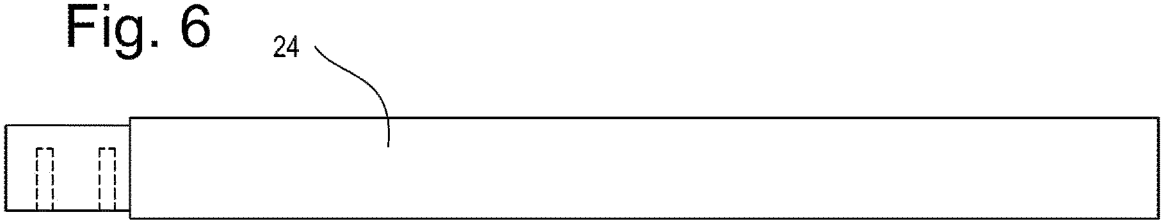
FIG. 7 is a side hidden line view of a handle section shown in FIG. 1.
Figure 8:
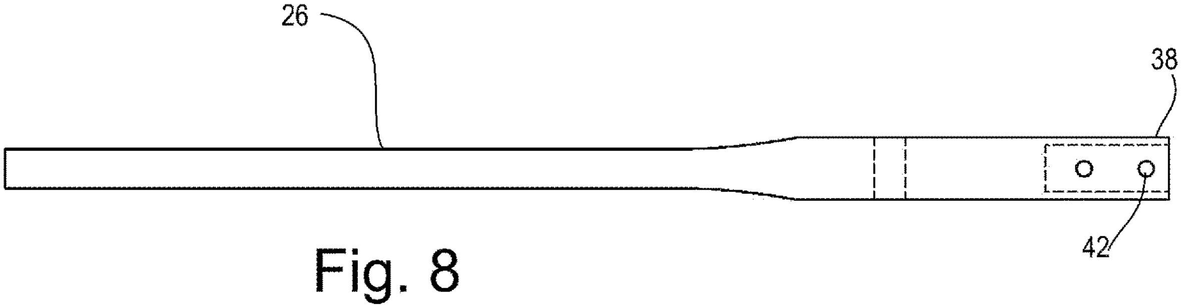
FIG. 8 is a top hidden line view of the blade section shown in FIG. 4.
Figure 9:
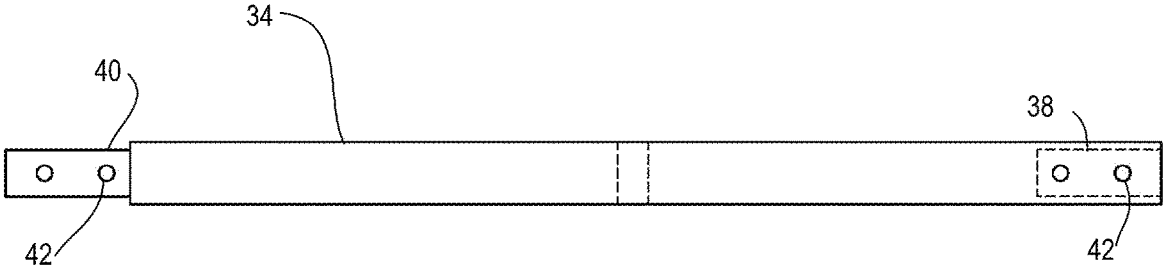
FIG. 9 is a top hidden line view of a handle section shown in FIG. 5.
Figure 10:
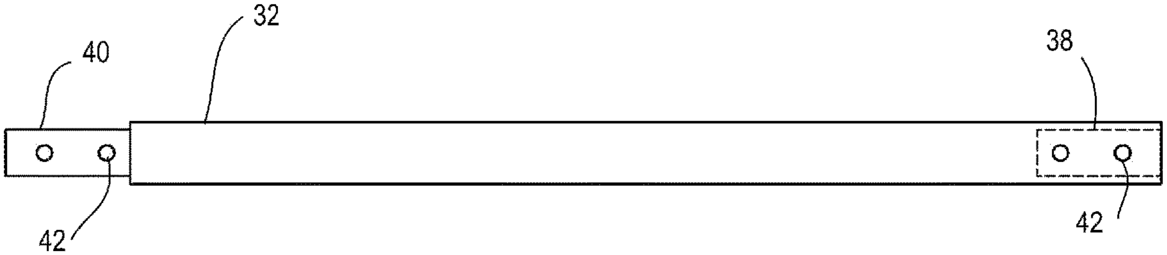
FIG. 10 is a top hidden line view of a handle section shown in FIG. 6.
Figure 11:
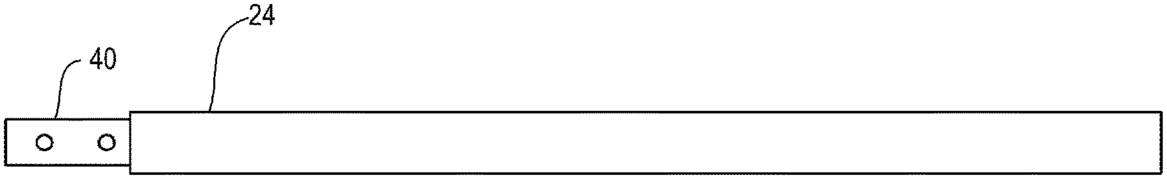
FIG. 11 is a top view of a handle section shown in FIG. 7.

In the field of sports, several sports including golf, hockey, lacrosse, etc. players use a sporting device 20, 220, 420, with an elongate (stick-like) handle or shaft 22 is used where a player will grasp the elongate handle 22 on a first end 24, and the sporting device 20 includes a blade 26, basket, head 426, or other device attached at the opposing second end 26 of the elongate handle. Such sporting devices 20 include hockey sticks, goalie sticks, golf clubs, lacrosse crosse, and equivalents. In this disclosure, the term “hockey stick” refers to both a hockey stick and a goalie stick, as well as other equivalent sporting devices.

Figure 26:
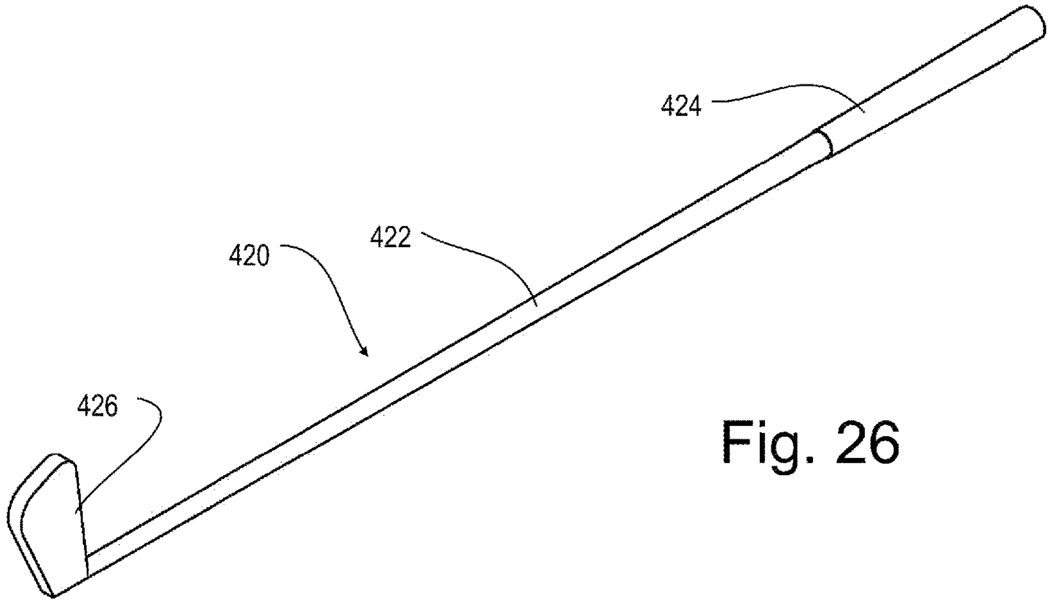
FIG. 26 is a is a perspective view of another example of the disclosed sporting handle shaft.
Figure 27:
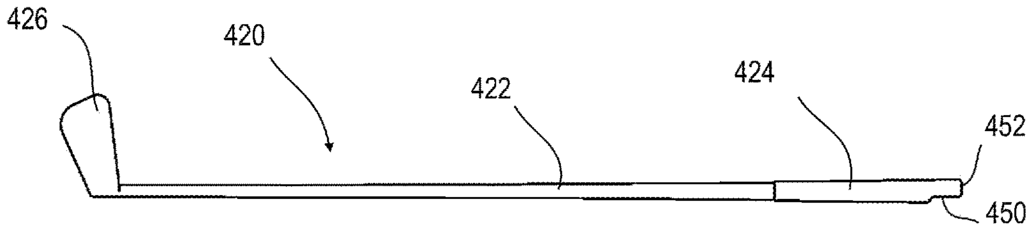
FIG. 27 is a side view of the example shown in FIG. 26.
Figure 28:
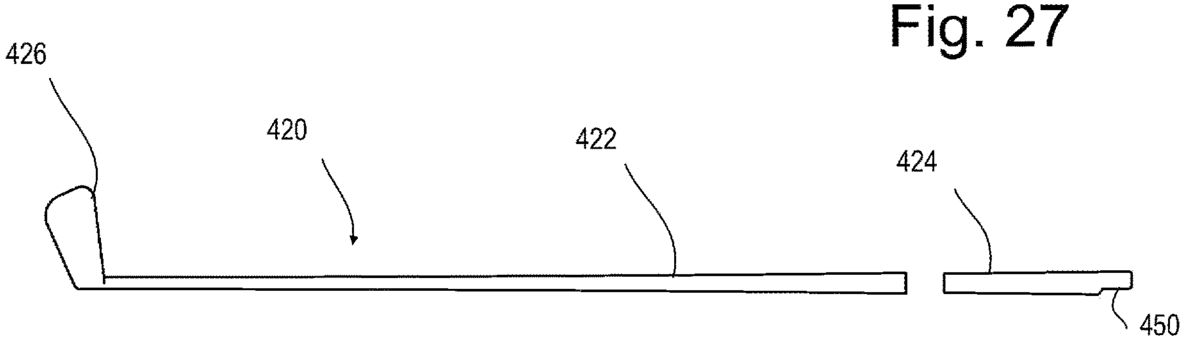
FIG. 28 is a partially exploded view of the example shown in FIG. 26.
Figure 29:
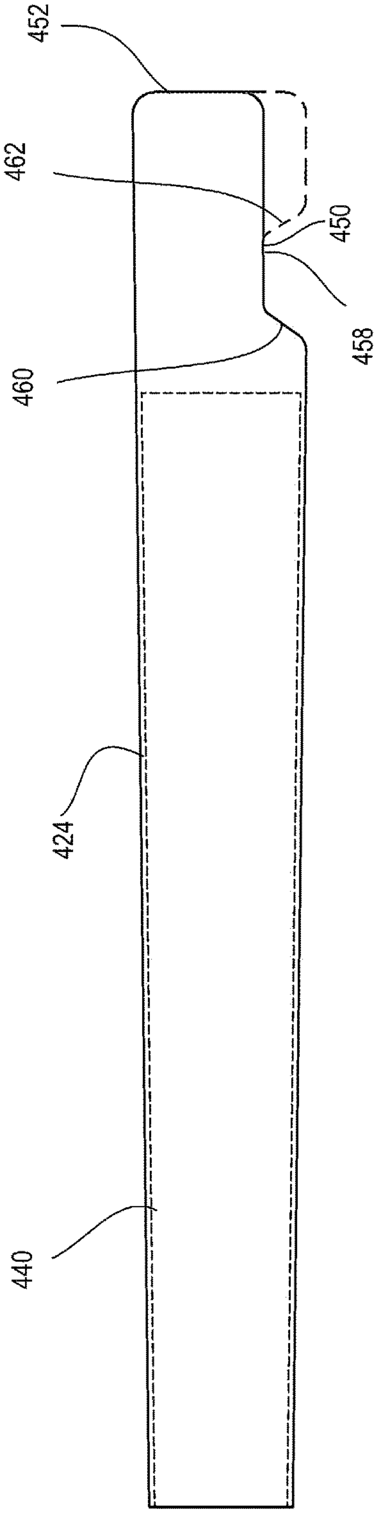
FIG. 29 is an isometric side hidden line view of a grip section of the example shown in FIG. 28.
Figure 30:
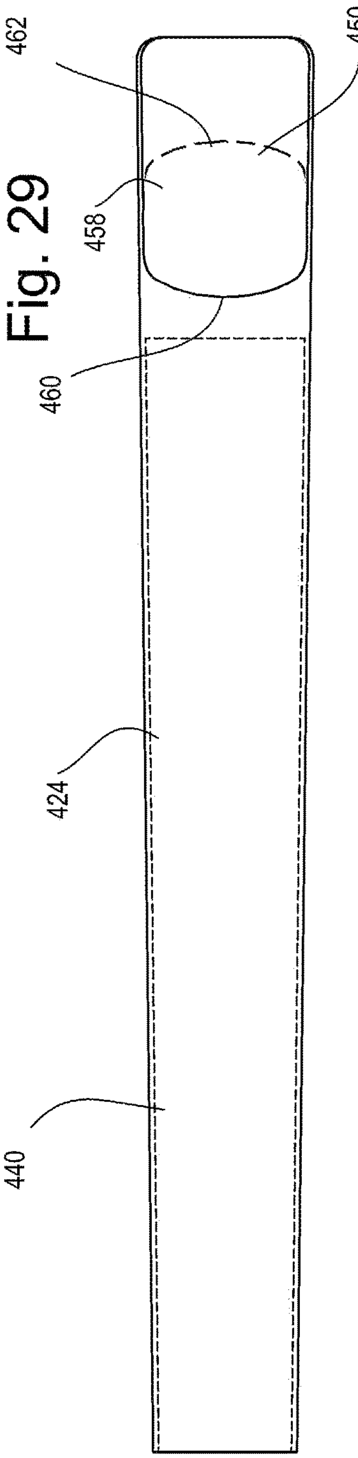
FIG. 30 is a bottom hidden line view of the example shown in FIG. 29.
Figure 31:
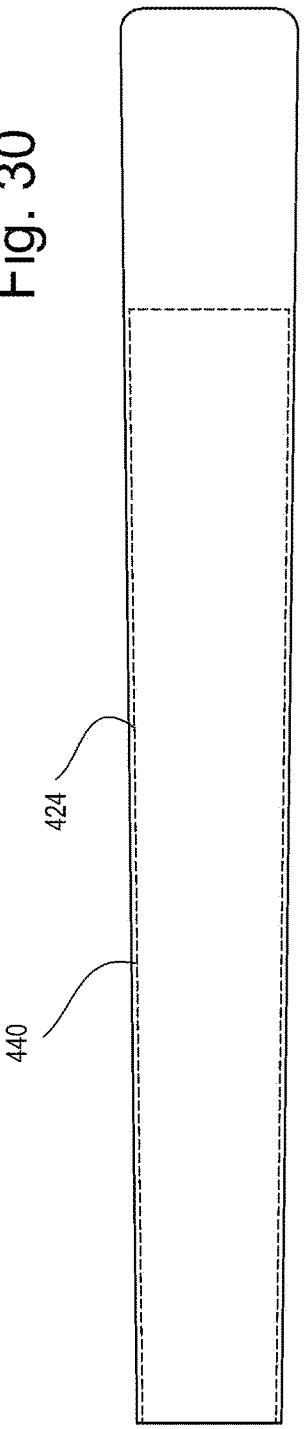
FIG. 31 is a bottom view of the example shown in FIG. 29.

For ease in description, similar components of different examples in this disclosure are numbered with a different numeric prefix (2, 4). For example, the sporting device 20 of FIG. 1 is similar to the sporting device 220 of FIG. 19, and similar in form and function to the sporting device (e.g., golf club) 420 of FIG. 26.

To aid in description, a non-limiting axes system 10 is utilized including a longitudinal axis 12 aligned with the long axis of the shaft 22, a transverse axis 14 orthogonal to the longitudinal axis 12 generally aligned with the blade 26, and a lateral axis 16 orthogonal to each of the longitudinal axis 12 and the transverse axis 14.

For ease in description here, the term “shaft” will refer to the elongate handle 22 while the term “head” is intended to encompass a blade 26, head 426, basket, etc.

In the example shown in FIG. 1-15, the sporting device 20 comprises the shaft 22 including a first shaft section 24 and separable blade section 26. In this example, the shaft 22 also includes optional additional second shaft section 32, and flag shaft section 34.

The term “flag” used herein encompasses a piece of material, cloth, rigid sheet, or other material of varying in size, shape, color, and design, usually attached at one edge to a staff or cord, and used as the symbol of a player, sporting team, nation, state, or organization, or as a means of signaling, etc. When used in conjunction with the hockey stick 20 or similar sporting equipment shown herein, the sporting device 20 is particularly good at showing support for a hockey team or affiliation while being easily stored and carried safely.

The example shown in FIG. 1 through FIG. 18 shows a sporting device 20 as a hockey stick. In this example the sporting device 20 is collapsible and doubles as a flagpole to support a flag 28.

Figure 12:
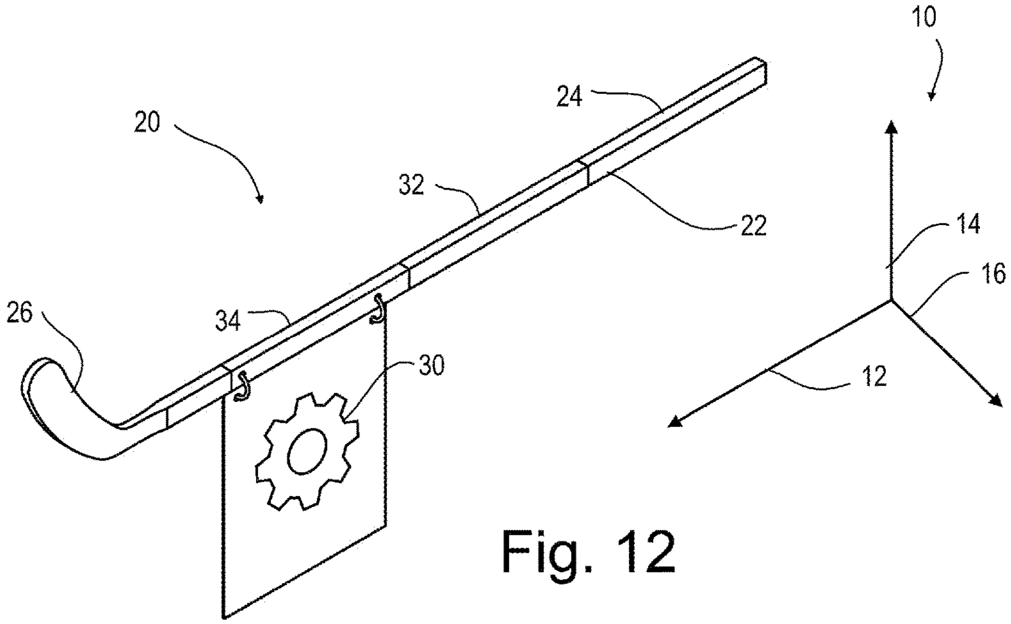
FIG. 12 is a perspective view of another example of the disclosed sporting handle shaft with attached flag.
Figure 13:
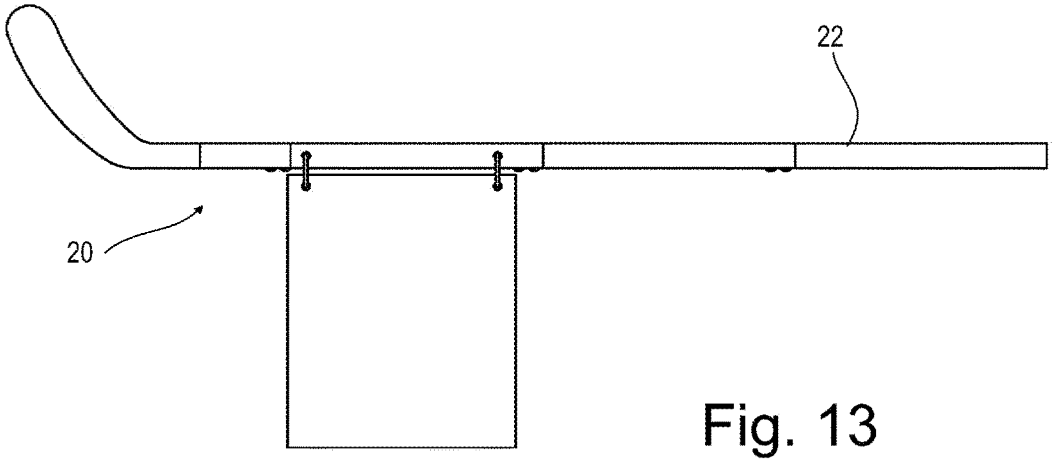
FIG. 13 is a side view of the example shown in FIG. 12.
Figure 14:
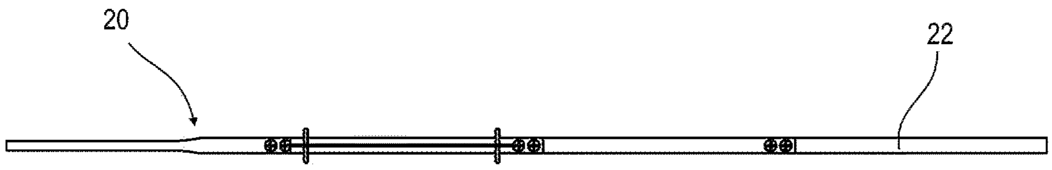
FIG. 14 is a bottom view of the example shown in FIG. 12.

In sporting venues, it is often not allowed for safety reasons for fans and supporters (people) to bring a potential weapon, such as a hockey stick into the sporting venue. Fans may wish however to show their support for a team by using a flagpole with a flag showing and emblem 30 (FIG. 12) of their team thereon. Because the sporting device 20 shown in FIG. 12 is comprised of several interconnecting sections 24, 26, 32, 34, and as so arranged the device may be easily disassembled as shown in FIG. 15-18 and carried in safely and/or unnoticed. In addition, due to the sections 24, 26, 32, 34, being relatively short, (e.g., less than 24, 18, or 12 inches each) and the connections therebetween, the assembled sporting device may be produced in a manner that would not function well as a weapon.

Figure 15:
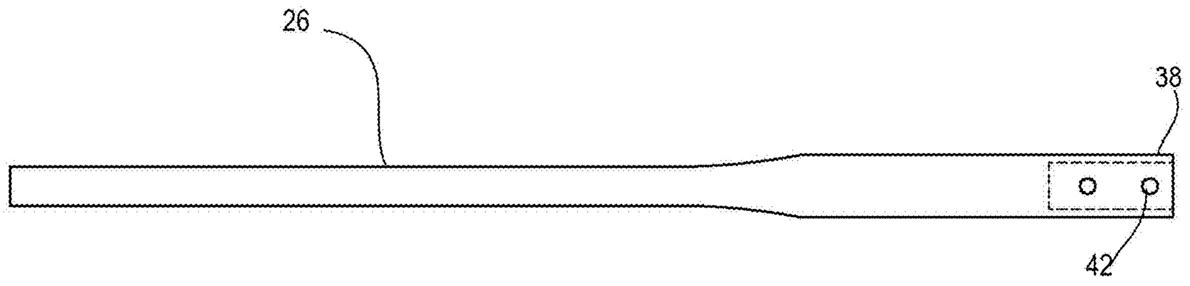
FIG. 15 is a top hidden line view of a blade section of the example shown in FIG. 12.
Figure 16:
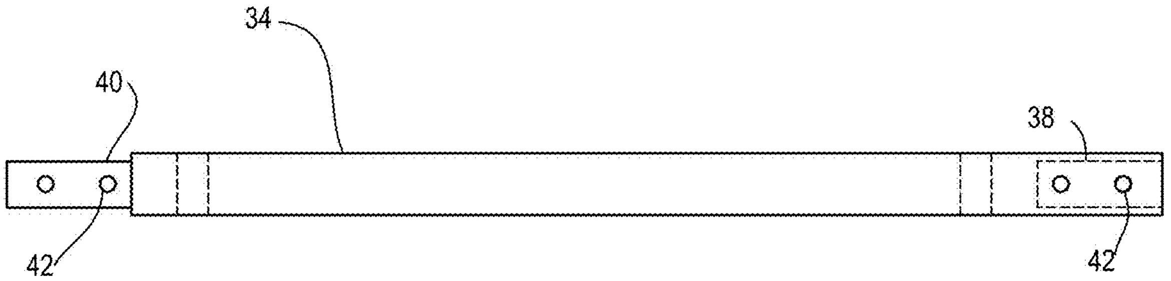
FIG. 16 is a top hidden line view of a handle section shown in FIG. 12.
Figure 17:
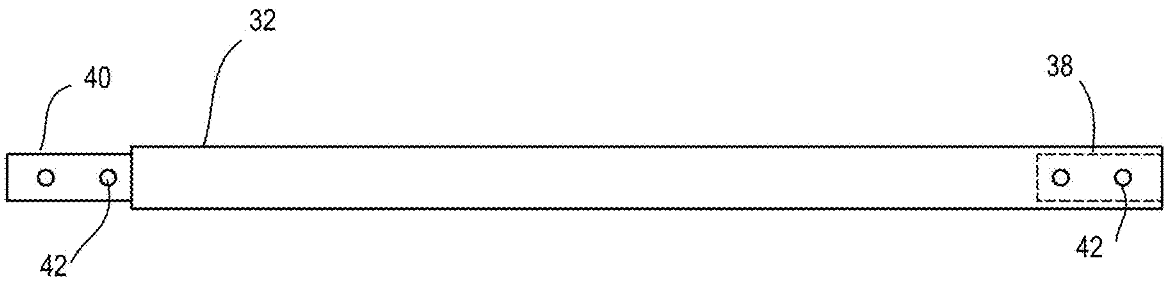
FIG. 17 is a top hidden line view of a handle section shown in FIG. 12.
Figure 18:
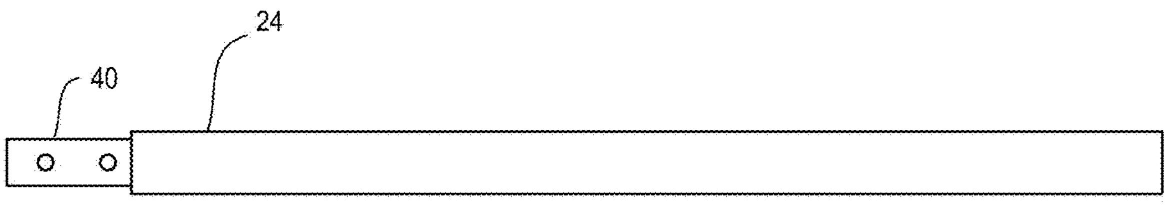
FIG. 18 is a side hidden line view of a handle section shown in FIG. 12.

In another application, sporting devices 20 may be attached to known flag brackets which are mounted to a structure such as a business or residence. One such bracket is disclosed in US patent U.S. Pat. No. 10,223,947B2 incorporated herein by reference. It may be desired that the flagpole used resemble a sporting device and be easy to store, transport, ship, and sell. The sporting device 20 disclosed herein may be sold and shipped in a disassembled state as shown in FIG. 15-1 and assembled by the purchaser or other user upon arrival or when needed. As the sporting device 20 is easily disassembled by separating the sections 24, 32, 34, 26 at the connectors 36 therebetween, the disassembled sporting device 20 may be easily stored and transported in a relatively small space.

The connectors 36 may comprise friction fit, pin and socket, ball and socket, latches, (removable) adhesive connections, magnetic catch, etc. In the example shown in FIG. 8-1, and FIG. 15-18 the connectors 36 each comprise a mortise 38 and tenon 40 to increase rigidity and ease of connection of the overall device 20. Each mortise 38 and each tenon 40 of each connector formed on adjacent sections 26, 34, 32, 24 of the sporting device 20. These may be uniform, allowing for modularity of the overall device 20. For example, the second shaft section 32 may be omitted to reduce the overall length of the device 20.

In the example shown, a latching device (component) 42 such as a ball catch or surface defining a void though with a pin, bolt, or screw is passed is provided on each tenon 40, and a mating receiver 42 is provided on each mortise 38. Thus, the apparatus may not accidentally become separated when being waved.

As shown, one or more flag connectors 44 are attached to the shaft 22 and to the flag 46. In this example these flag connectors 44 are attached along a connecting edge 48 of the flag 46. These flag connectors 44 may be rigid rings as shown, strings, snaps, screws, rivets, adhesives, hooks, zip ties, etc. attached to holes in the flag and in the handle or otherwise attached. In the example shown, the flag 46 spans adjacent sections, with a connector 44 on the blade section 26 and a connector 44 on the adjacent flag section 34. This arrangement also places the flag longitudinally 12 across flag sections. In the example shown in FIG. 12, the connectors 44 are provided on a single flag section 34.

Figure 19:
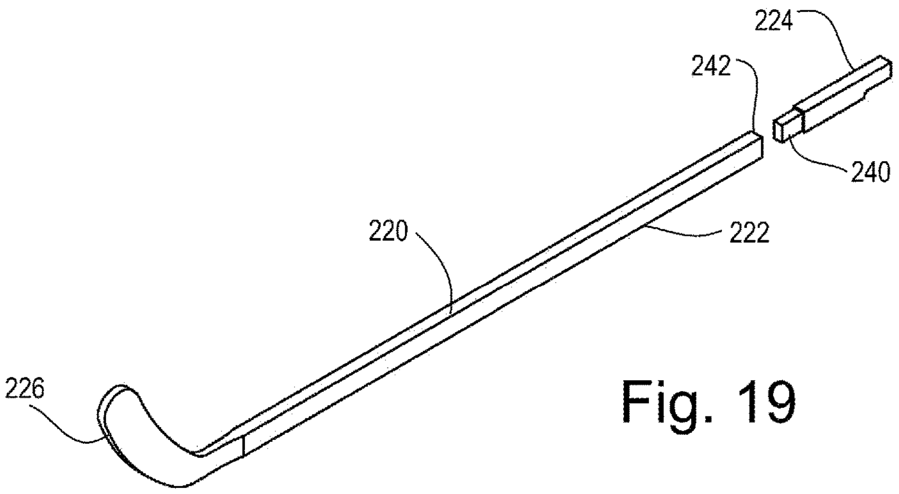
FIG. 19 is a is a perspective view of another example of the disclosed sporting handle shaft.
Figure 20:
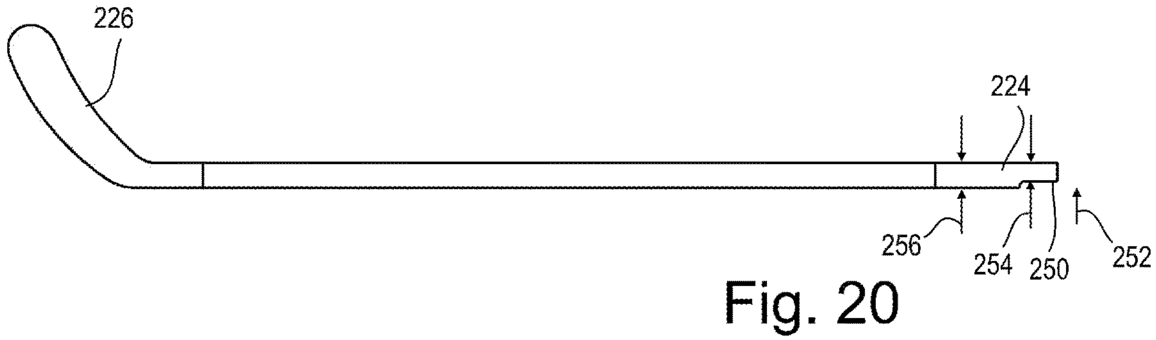
FIG. 20 is a side view of the example shown in FIG. 19.
Figure 21:
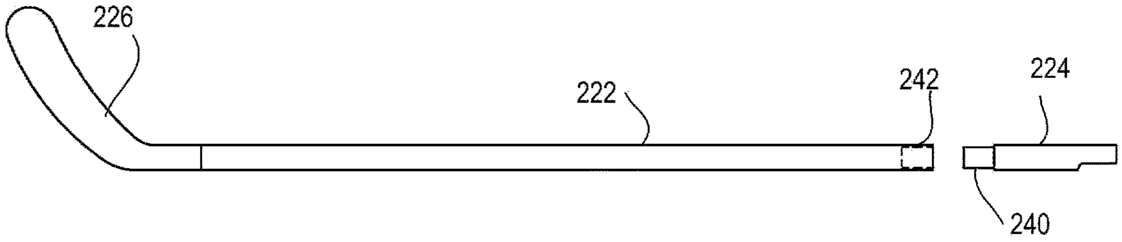
FIG. 21 is a partially exploded view of the example shown in FIG. 19.
Figure 22:
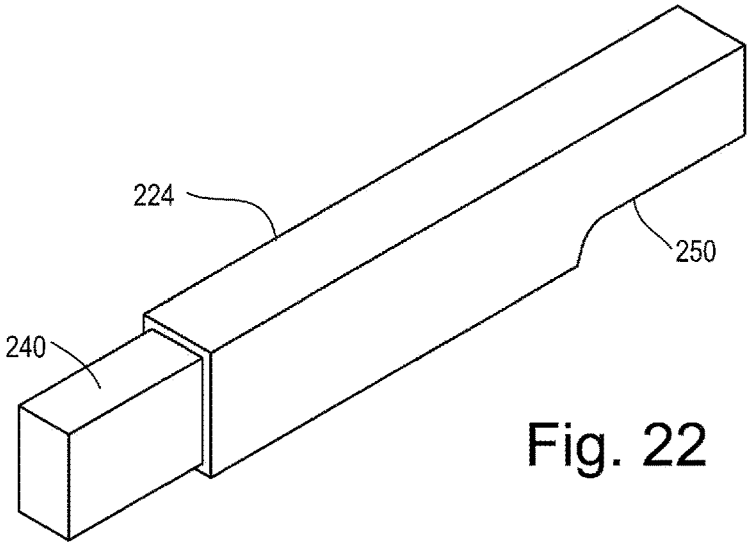
FIG. 22 is an enlarged perspective view of a grip section of the example shown in FIG. 19.
Figure 23:
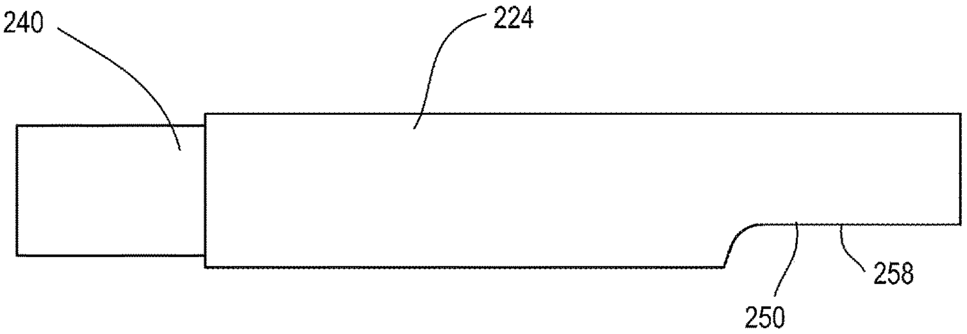
FIG. 23 is a side view of the example shown in FIG. 22.
Figure 24:
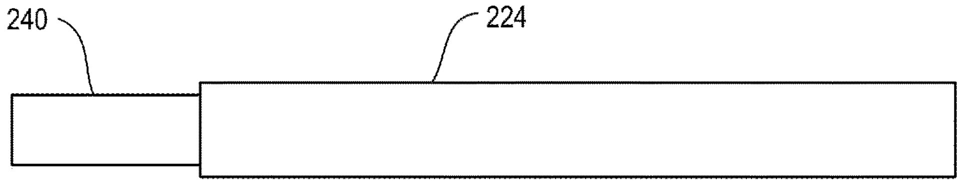
FIG. 24 is a top view of the example shown in FIG. 22.
Figure 25:
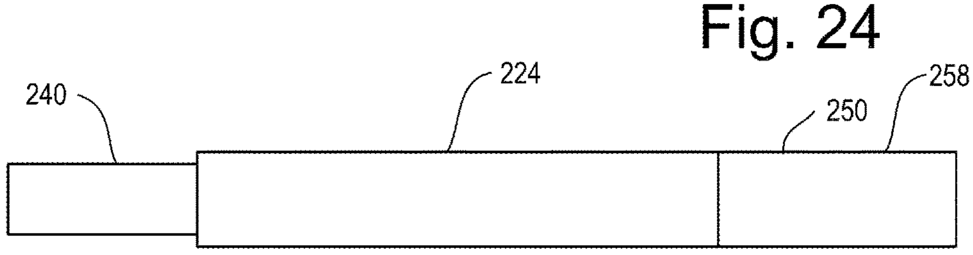
FIG. 25 is a bottom view of the example shown in FIG. 22.

In addition to the blade section 26 and the shaft sections (32, 34) also disclosed is grip section 224 attached to the grasping (first) end of the shaft 222 as shown in FIG. 19. The grip section 224 comprising a tenon 240 which may be inserted into the first end of the shaft 22 and fixed in place by adhesives, shrink fit, press fit, fasteners, or a combination thereof.

This grip section 224 allows the player to grip the hockey stick 220, as one normally would, but the grip end of the hockey stick is changed to incorporate novel features. This change facilitates greater gripping strength and control in that the player’s top hands’ small finger (or pinky) (small proximal phalanx) rests in a finger groove 250 which is transversely indented 252 from the rest of the adjacent surface of the grip section thus having a relatively smaller gripping diameter 254 than the diameter 256. Thus, the finger groove 250 of the grip section 224 of one example is only on one side of the grip section 224. In one example the finger groove is provided on the side transversely in opposition to the direction the blade section projects.

The finger groove 250 also helps a user to tactilely identify the relative position of the head or blade in the user's hand. This is especially useful when used with a shaft 22, 222, 422 which may be rotationally symmetric. As such, in one example the finger groove 250 comprises a flat, or planar region 258 which in one example extends across the lateral width of the grip section 224.

The gripping ends of many sporting devices such as hockey sticks, golf clubs, etc. have or can have a hollow core. For example: most traditional wooden hockey sticks are not 'hollow.' Composite, carbon fiber, and aluminum sticks, are often 'hollow.' These sporting devices 20 can receive grip sections 224 with tenons 240 as disclosed herein.

This grip section 224 of one example with the tenon 240 described above is fixed to the grasping end (grip section 224) of the hockey stick or other sporting device permanently to change the grasping end of the shaft 22.

This grip section 224 of one example is designed so that the small (pinky) finger (small proximal phalanx) has a smaller diameter area 254 to grip. Traditional hockey sticks all have the same size gripping area throughout the hockey stick. Therefore, the end of the stick does not change.

This hockey stick adapter plug claims to allow the player to better utilize the hockey stick for stick handling, passing, shooting, and checking.

By gripping the top end of the hockey stick with this new grip 224, the top hand (hand grasping the grip section) on the hockey stick can move more freely and with more resistance to longitudinal sliding. It will be easier to grip the grasping end of the hockey stick as the small finger (pinky) (small proximal phalanx) can grip a smaller area 254 of the hockey stick shaft at the finger groove 250.

This grip section 224 changes the grasping end of the hockey stick. The top hand on the stick will have an easier time gripping the top of the stick. It will make shooting the puck easier as the top hand moves more freely. It will also allow for better control of the hockey stick.

In FIG. 26-FIG. 31 is shown an example of a similar and functionally equivalent grip section 424. This grip section in one example comprises a sporting device grip (for example a golf club, sailing tiller, or lacrosse crosse). The grip section 424 which may include a hollow female receiver 440 which fits about the shaft 422 of the sporting device and is friction fit, adhered, or otherwise affixed to the shaft 422.

This example also has a finger groove 450 equivalent to the finger groove 250 previously described and including a planar region 458 to aid in grasping by the user's small proximal phalanx. In the example shown in FIG. 27 and FIG. 28, the finger groove 450 planar region 458 extends to the adjacent end 452. In the example shown in FIG. 29 and FIG. 30 the finger groove may extend to the end 452 or may comprise longitudinally facing sides 460 and 462 shown with broken lines as one alternative.

This example which does not extend to the end 452 may be desired when a user/player wishes to keep their small proximal phalanx from sliding along the grip section 424.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept. The invention illustratively disclosed herein suitably may be practiced in the absence of any element which is not specifically disclosed herein.

The invention claimed is:

1. A sporting device comprising:
- an elongate handle having a first end longitudinal configured to be grasped by a user;
- the elongate handle having a second end comprising a head extending transversely from the elongate handle;
- the first end of the elongate handle comprising a grip section removably attached to the elongate handle;
- the grip section having a transverse outer surface;
- the first end of the elongate handle is substantially hollow;
- the grip section comprises a male tenon slide fit into the hollow first end;
- the grip section comprises a finger groove transversely indented from the transverse outer surface of the grip section;
- the finger groove configured to facilitate and improve gripping by the player's small proximal phalanx.

2. The sporting device as recited in claim 1 wherein the sporting device comprises a hockey stick.

3. The sporting device as recited in claim 1 wherein the sporting device comprises a goalie stick.

4. The sporting device as recited in claim 1 wherein:
- the grip section comprises a surface defining a female receiver slide fit over the first end of the elongate handle;
- the grip section comprises a finger groove transversely indented from the transverse outer surface of the grip section;
- the finger groove configured to facilitate and improve gripping by the user's small proximal phalanx.

5. The sporting device as recited in claim 3 wherein the sporting device comprises a golf club.

6. A sporting device comprising:
- an elongate handle having a first longitudinal end configured to be grasped by a user;
- the elongate handle being segmented;
- the elongate handle comprising a blade section having a first end with a blade extending transversely therefrom and a longitudinally opposed second end;
- the elongate handle comprising a flag shaft section having a first longitudinal end attached to the second end of the blade section, and a first shaft section;
- the elongate handle having a second end comprising a head extending transversely from the elongate handle;
- at least one attachment point on the flag shaft section; and
- a flag attached to the flag shaft section and extending transversely therefrom.

* * * * *